United States Patent
Herbst

(10) Patent No.: US 8,111,952 B2
(45) Date of Patent: Feb. 7, 2012

(54) STRAIN SENSING DEVICE AND METHOD OF MEASURING STRAIN

(75) Inventor: Brian Gerald Herbst, Easley, SC (US)

(73) Assignee: AFL Telecommunications LLC, Franklin, TN (US)

( * ) Notice: Subject to any disclaimer, the term of this patent is extended or adjusted under 35 U.S.C. 154(b) by 0 days.

(21) Appl. No.: 12/278,140

(22) PCT Filed: Jan. 31, 2007

(86) PCT No.: PCT/US2007/002557
§ 371 (c)(1),
(2), (4) Date: Aug. 1, 2008

(87) PCT Pub. No.: WO2007/089791
PCT Pub. Date: Aug. 9, 2007

(65) Prior Publication Data
US 2009/0034903 A1    Feb. 5, 2009

Related U.S. Application Data

(60) Provisional application No. 60/743,203, filed on Feb. 1, 2006.

(51) Int. Cl.
  *G02B 6/00* (2006.01)
(52) U.S. Cl. ............................................ 385/12; 385/13
(58) Field of Classification Search .................... 385/12, 385/13
See application file for complete search history.

(56) References Cited

U.S. PATENT DOCUMENTS

| 4,897,542 | A | * | 1/1990 | Dakin et al. ............. 250/227.21 |
| 4,927,232 | A |   | 5/1990 | Griffiths |
| 6,389,187 | B1 | * | 5/2002 | Greenaway et al. ............ 385/13 |
| 6,876,785 | B1 |   | 4/2005 | Li et al. |
| 7,008,103 | B2 | * | 3/2006 | MacDougall ................. 374/117 |
| 2004/0114850 | A1 | * | 6/2004 | Dewyntermarty et al. ..... 385/13 |
| 2004/0184700 | A1 | * | 9/2004 | Li et al. ........................... 385/12 |
| 2004/0223679 | A1 | * | 11/2004 | Pickrell et al. .................. 385/12 |

FOREIGN PATENT DOCUMENTS

| EP | 0 983 486 B1 | 8/2005 |
| JP | 2002-005759 A | 1/2002 |
| JP | 2005-274200 A | 10/2005 |

OTHER PUBLICATIONS

Russian Office Action No. 2008-131050/28, dated Apr. 1, 2011, English Translation.

* cited by examiner

*Primary Examiner* — Rhonda Peace
(74) *Attorney, Agent, or Firm* — Sughrue Mion, PLLC

(57) ABSTRACT

A strain sensing device has a sub-assembly with at least one optical fiber therein, and a metallic coating encasing the sub-assembly. The metallic coating is strain coupled to the sub-assembly. A strain sensing system and a method of anticipating failure in a structure are provided. The strain sensing system and method of anticipating failure in a structure use the strain on the strain sensing device to calculate the strain on a structure of interest.

25 Claims, 2 Drawing Sheets

STRAIN SENSING DEVICE AND METHOD OF MEASURING STRAIN

This application claims the priority of U.S. Provisional Application No. 60/743,203 filed on Feb. 1, 2006, in the United States Patent and Trademark Office the contents of which are hereby incorporated by reference.

BACKGROUND OF THE INVENTION

1. Field of the Invention

The present invention relates to a strain sensing device and ways to use the device for measuring strain. More specifically, the present invention relates to a strain sensing device including an optical fiber within a sub-assembly, wherein the sub-assembly is encased in a metallic coating which is strain coupled to the sub-assembly.

2. Description of the Related Art

Fiber optic sensors have a wide variety of applications for sensing parameters such as pressure, strain and temperature. Fiber-optic sensors possess several advantages over their electrical and electromechanical counterparts. For example, fiber-optic sensors can be made smaller, have longer lifetimes and are made from non-conducting glass, thus providing immunity from electromagnetic interferences.

In the related art, fiber optic sensors are attached to a structure of interest in such a way that strain may be measured using conventional tools. Some examples of structures of interest include, but are not limited to, casings of oil wells, bridges, buildings, steam pipes, and any other structure where strain sensing can provide predictive data on potential failure of the structure. Some techniques used to measure strain include Fiber Bragg gratings and a Brillouin Optical Time Domain Reflectometer.

Sensing with Fiber Bragg gratings includes using a sensor having a series of refractive index perturbations along an optical fiber and a light source coupled to the optical fiber. The Fiber Bragg gratings simply reflect the light traveling in the forward direction in the core of the optical fiber backwards into the core. When the sensor is strained, such as by compression or stretching of the optical fiber due to mechanical forces, or a temperature change, the spacing between the gratings varies, which correspondingly varies the arrival timing of the reflected light to the device. This effect is similar to that of an accordion, where the output note changes as the accordion is stretched and compressed. Monitoring the change in arrival timing of the reflected light can then be used to measure the strain, temperature or pressure on the optical fiber. The user may then correlate the strain on the optical fiber to determine the strain on the structure of interest.

The equipment for measuring strain is selected based on the needs of the user. Measuring the strain using Fiber Bragg gratings, for example, allows the user to measure strain in a dynamic environment with a significant improvement in speed.

The fiber optic sensor may be attached to the structure in several ways. The sensor may be attached directly to the surface of an existing structure. The sensor may also be optionally inserted into a structure either during, or after construction.

One problem with conventional strain sensors is that they are limited in their application. Related art fiber optic sensors are not sturdy enough to be employed in all but the mildest conditions. Further, even sensors having some protective coating do not survive the conditions needed to deploy these sensors successfully in environments having mechanical, chemical and pressure-related hazards. These hazards may have an affect not only on the strain sensor itself, but also the attachment method used to attach the strain sensor to the structure of interest.

One example of a harsh environment where ordinary strain sensors cannot typically survive is the application of strain sensing in oil well components. There exists a documented need in the industry for measuring the strain on the casings of oil wells. The ability to measure strain, or anticipate a potential collapse, of an oil well becomes critical to maintaining the integrity of the well, as well as saving the equipment deployed for drilling oil. However, an oil well may reach depths of well over 15,000 feet. Additionally, an oil well may be additionally submerged in water, and in some cases salt water. In this example, deploying a fiber optic sensor in such an environment would subject the sensor to issues of high earth core temperatures, high pressure due to the depth and aggressive chemical materials, which may come from the water, the ground or both.

Other examples of environments where strain sensing becomes critical is in bridges or any other concrete structure. In this environment, a strain sensor may be embedded within the concrete structure, such that the strain on the structure may be measured. Early detection of cracking of the structure's foundation allows the user to perform remedial measures early in the breakdown process, thus saving the structure from potential total and unexpected failure. A problem associated with embedding related art strain sensors in such structures relates to the integrity of the optical fiber within the sensor. Specifically that the optical fiber within the sensor is too weak to survive a potential cracking of the structure, and the integrity of the optical fiber would be compromised from even a small shift within the foundation.

The above problem is particularly prevalent in structures where the strain sensor is embedded in the concrete at the time the structure is built, thus providing the tightest fit between the structure and the sensor.

There exists a need for a strain sensing device which could survive hazardous environments such as those described above, while providing an accurate strain sensing measurement system. There further exists a need for a strain sensing device that would allow the user to anticipate potential failure of structures without compromising the integrity of the optical fiber within the strain sensing device.

SUMMARY OF THE INVENTION

Exemplary embodiments of the present invention overcome the above disadvantages and other disadvantages not described above and provide advantages which will be apparent from the following description of exemplary embodiments of the invention. Also, the present invention is not required to overcome the disadvantages described above.

According to an aspect of the present invention, there is provided a strain sensing device, which in one exemplary embodiment may be a strain sensing cable, having a sub-assembly with at least one optical fiber within the sub-assembly and a metallic coating which encases the sub-assembly, wherein the metallic coating is strain coupled to the sub-assembly.

The strain sensing device may have the outer diameter of the sub-assembly that is greater than the inside diameter of the metallic coating, and the sub-assembly may be compressed so as to fit within the metallic coating, thereby transferring strain from the metallic coating directly to the optical fiber.

According to another aspect of the present invention, the strain sensing device may have an outer diameter of the sub-assembly which is equal to the inside diameter of the metallic coating, so that when the sub-assembly is compressed to fit within the metallic coating, the created strain is translated from the metallic coating directly to the optical fiber.

According to another aspect of the present invention, the strain sensing device may also have an outer diameter of the sub-assembly which is smaller than an inside diameter of the metallic coating, and the metallic coating is then compressed onto the sub-assembly so as to translate strain from the metallic coating directly to the optical fiber.

According to another aspect of the present invention, there is provided a strain sensing system comprising: a strain sensing device which has, a sub-assembly, at least one optical fiber within the sub-assembly; and a metallic coating which encases the sub-assembly, wherein the metallic coating is strain coupled to the sub-assembly; as well as a structure of interest the strain of which is to be measured, wherein the strain sensing device is connected to said structure; and a strain measuring system which measures strain in the strain sensing device, wherein the strain on said device is used in determining the strain on said structure.

The strain sensing system according to the above aspect, may have the strain sensing device connected to the structure of interest by the metallic coating.

According to another aspect of the present invention, there is provided a method of anticipating failure in a structure, comprising the steps of: attaching the strain sensing device, having a metallic strain coupled coating, to a structure of interest, wherein the strain of said structure is to be measured; measuring the strain on the strain sensing device; and then correlating the strain on the device to the strain on the structure. Additionally, the method of anticipating failure in a structure may have the strain on the device measured along the length of the optical fiber.

BRIEF DESCRIPTION OF THE DRAWINGS

The above and other features and advantages of the present invention will become more apparent from detailed exemplary embodiments set forth hereinafter with reference to the attached drawings in which.

DETAILED DESCRIPTION OF EXEMPLARY EMBODIMENTS OF THE INVENTION

Figure 1:
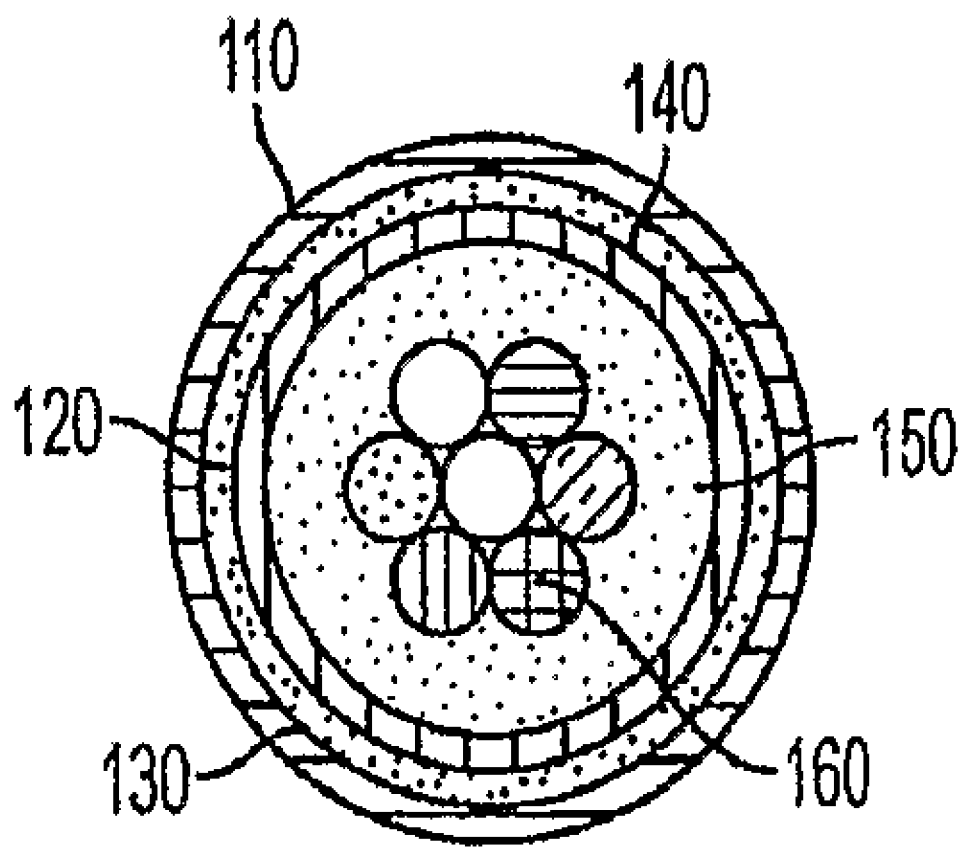
FIG. 1 is a cross sectional view of a strain sensing device according to an exemplary embodiment of the present invention.

The present invention will now be described more fully with reference to the accompanying drawings, in which exemplary embodiments of the invention are shown. Like reference numerals in the drawings denote like elements.

Figure 2:
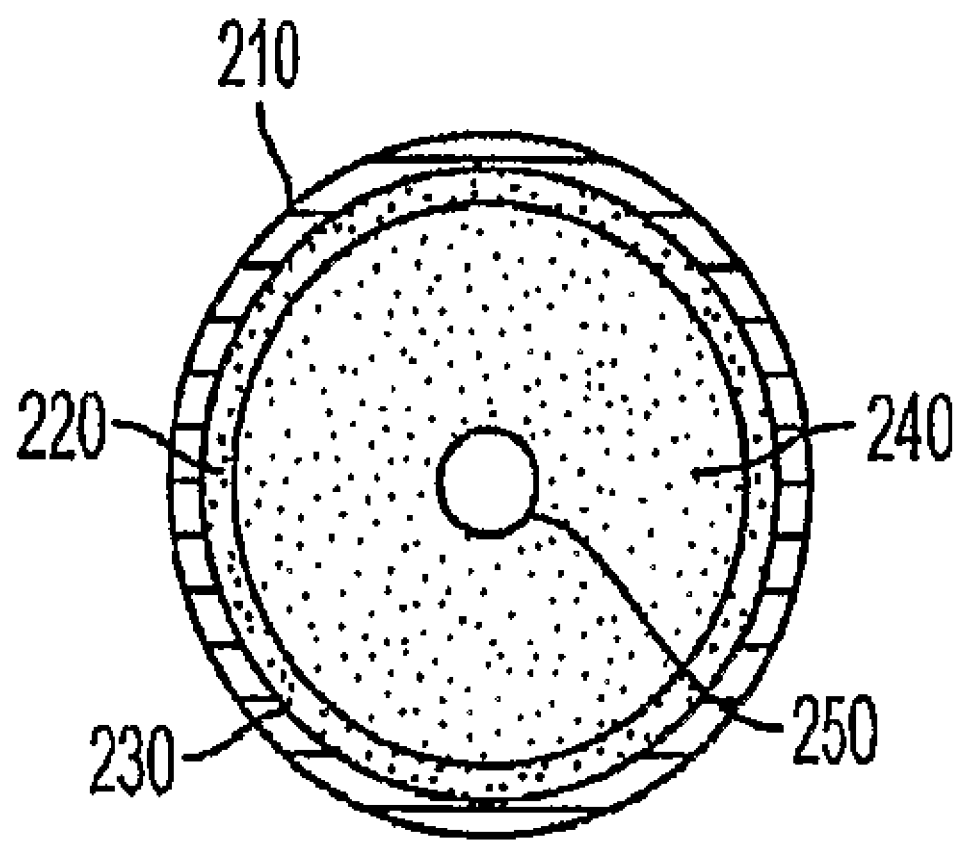
FIG. 2 is a cross sectional view of a strain sensing device according to another exemplary embodiment of the present invention.

Referring to FIG. 1, there is illustrated a cross sectional view of a strain sensing device according to an exemplary embodiment of the present invention. In this exemplary embodiment of the invention, the strain sensing device is in the form of a strain sensing cable. The strain sensing cable of FIG. 1, includes a sub-assembly 120 containing optical fibers 160. FIG. 1 shows seven optical fibers 160 within the sub-assembly 120, but one of ordinary skill in the art will understand that any number of optical fibers may be used. For example, FIG. 2 shows the strain sensing cable wherein only a single optical fiber 250 is included within the sub-assembly 220.

In FIG. 1, an exemplary embodiment of a sub-assembly 120 is comprised of an inner layer 140 and a jacket 130. In this exemplary embodiment, the optical fibers 160 are coupled to the sub-assembly 120 using coupling material 150. The sub-assembly 120 is encased within a metallic coating 110, wherein the metallic coating is strain coupled to the sub-assembly 120 by way of friction between the metallic coating and the sub-assembly. The optical fibers 160 are the strain sensing elements. Thus, strain on the metallic coating 110 travels through the entire sub-assembly 120 and is translated to the optical fibers 160 to properly measure the strain.

The metallic coating of the present invention must be sufficiently strong and corrosion resistant, so as to be able to withstand the adverse environment associated with strain sensing. However, at the same time, the metallic coating must be able to transmit the strain through the sub-assembly to the optical fibers, so that the strain on the metallic coating may be accurately, measured. In one exemplary embodiment of the present invention, the metallic coating of the strain sensing device may be a metal tube. Stainless steel is an example of a material that may be used for the metallic coating, however, the present invention is not limited to stainless steel and any other material having characteristics consistent with the above criteria may be used.

Measuring of the strain on the strain sensing device may be accomplished using conventional measuring systems such as the Fiber Bragg gratings or the Brillouin Optical Time Domain Reflectometer described above.

The coupling material 150 can be a variety of materials including extruded materials, thermal cure materials, ultraviolet cured materials or any other material that will be able to accurately transmit the strain on the outer sub-assembly to the optical fiber without significant strain dissipation. Some criteria that may be used for selecting the appropriate material can be the expected strain in the structure of interest, and the temperature of the environment where the strain sensing device is to be used. The material selected would also need to provide good bonding between the elements of the strain sensing device to ensure that when the outer metallic coating is strained, the strain translates to the optical fiber through the various materials. Signal clarity, as defined by perfect strain translation from the metallic coating to the optical fiber, can be affected by the materials used inside of the sub-assembly.

FIG. 2, shows a strain sensing device which is comprised of a sub assembly 220, including a jacket 230, the optical fiber 250, and the coupling material 240 that is used to couple the optical fiber 250 to the sub-assembly 220. In this exemplary embodiment, the inner layer of the sub-assembly 220 is removed. The decision on whether to include the inner layer of the sub-assembly in the present invention is left to the user. A strain sensing device that does not include the inner layer, for example, reduces the manufacturing complexity of the strain sensing device. A strain sensing device that includes an inner layer, or any of the components between the metallic coating and the fiber, provides cushioning between the optical fiber and the metallic coating, thus allowing the strain from the metallic coating to be translated to the optical fiber without inducing an optical loss in the fiber.

In another embodiment, only a metallic coating and a optical fiber is provided. The metallic coating is strain coupled to the fiber, using coupling techniques described below. In this exemplary embodiment, the metallic coating must be able to translate strain to the optical fiber without inducing optical loss within the fiber and without any cushioning structure between the optical fiber and the metallic coating:

In one embodiment, strain coupling between the metallic coating and the sub-assembly is achieved as follows. A sub-assembly 120 is provided, which has an outer diameter that is larger than an inside diameter of the metallic coating 110. When the sub-assembly 120 is encased in the metallic coating 110, having a smaller inside diameter than the outer diameter of the sub-assembly 120, the sub-assembly 120 is compressed and strain on the metallic coating 110 is translated through the sub-assembly 120 to the optical fibers 160 due to friction.

Specifically, the metallic coating 110 will stretch and compress together with the structure of interest. Because the sub-assembly 120 is coupled to the metal metallic coating 110 by a friction force, it translates the strain from the metallic coating, through the sub-assembly and directly to the optical fiber 160. The strain on the optical fiber 160 may then be measured using a related art measuring tool as described above. The strain on the optical device 160 may then be correlated to the strain on the structure and a potential failure of the structure may be anticipated.

The sub-assembly may be placed within the metallic coating in a variety of ways, but is not limited to the ways described below. In one exemplary embodiment, a drawing die may be used to reduce the diameter of a larger tube down to the target size of the finished tube diameter, thus creating the desired product. Alternatively, the metallic coating may be opened lengthwise and then closed back together after inserting the sub-assembly. In one exemplary embodiment, where the metallic coating is a metal tube, the metal tube may be manufactured as described in European Patent No. EP0299123.

In another embodiment, the sub-assembly 120 can have an outer diameter that is smaller than the inside diameter of the metallic coating 160. The sub-assembly 120 is then encased in the metallic coating 160. Next, the metallic coating 160 may be compressed between two rollers that are set to a gap providing the desired compression of the metallic coating 160 onto the sub-assembly 120. The actual level of compression necessary is experimentally determined and is further dependent on the materials used to make the sub-assembly and the metallic coating.

In another exemplary embodiment, the sub-assembly 120 may have an outer diameter that is smaller than, or equal to, the inside diameter of the metallic coating 160. In this example, the optical fiber may be covered with a foaming agent which expands when exposed to a heat source. In such a case, the optical fiber, covered with a foaming agent, is encased in the metallic coating. Next, the sub-assembly within the metallic coating would be exposed to a heat source to activate the foaming agent and strain couple the elements together.

The compression level used in the manufacture of the strain sensing device is hereinafter referred to as the coupling force. The coupling force between the metallic coating 110 and the sub-assembly 120 is related to the diameter of the sub-assembly 120 and the inside diameter of the metallic coating 110. The larger the diameter of the sub-assembly 120, the larger the coupling force. The amount of coupling force needed to ensure that the strain on the metallic coating 110 is translated to the sub-assembly 120, and in turn to the optical fibers 160, depends on the materials used in the structure of the strain sensing device. Because a high coupling force may strain the sub-assembly 120 during the manufacturing process, the coupling force should be kept as low as possible, while continuing to translate strain to the optical fibers 160. The proper amount of coupling force may be determined experimentally for differing types of materials.

In one exemplary embodiment of the strain sensing device, an optical fiber was coated first with silicone to 600 μm and then with a polyvinylidene fluoride (PVDF) jacket to make the sub-assembly. In this exemplary embodiment, a stainless steel tube was used as a metallic coating. The silicone and PVDF covered optical fiber, or the sub-assembly, of this embodiment was then encased within a stainless steel tube having an outside diameter of 1.84 mm with an inside diameter of 1.44 mm. The following data represents examples of strain coupling between the metallic coating and the sub-assembly of the above-described exemplary embodiment. When the diameter of the PVDF was 1.46 mm, the resultant strain on the fiber ranged from 0.2 to 0.4%. When the diameter of the PVDF was 1.48 mm, the resultant fiber strain ranged from 0.6 to 1.0%. When the diameter of the PVDF was 1.50 mm, the resultant fiber strain was 1.5 to 2.0%. The variation in the strain between the stainless steel tube and the sub-assembly of this embodiment was due to variations of the diameter around its nominal target.

Determining the initial level of strain on the optical fiber will be left to the user. If, for example, the strain sensing device will have positive strain induced by stress or by temperature, then the desired starting point is to have the fiber at a lower initial strain level. Conversely, if the cable is expected to see compression due to low temperature exposures or negative strain induced by stress, then a higher initial strain level may be desirable.

The coupling force should be at least large enough to prevent the slippage of the optical fibers 160 within the sub-assembly 120. If the coupling force of the sub-assembly 120 is not large enough, the optical fibers 160 within the sub-assembly 120 will slip, causing the strain sensing device to produce inaccurate results. Additionally, a low coupling force between the metallic coating and the optical fiber may lead to a dissipation of the strain on the fiber, thus reducing the sensitivity of the strain sensing device.

By encasing the sub-assembly 120 within a metallic coating 110, resistance to chemical hazards, pressure and mechanical hazards may be increased. Additionally, in one exemplary embodiment, the metallic coating 110 may be directly attached to the structure of interest, thus decreasing the effect of hazards which affect the attachment method of the strain sensing device to the structure of interest. The metallic coating 110 allows the attachment method of the strain sensing device to the structure of interest to be more aggressive than what could be applied if the optical fiber alone was attached to the structure, for example physical clamping of the metallic coating to the structure or a using higher strength adhesive to attach the device to the structure.

Additionally, in embodiments where the strain sensing device is placed, or embedded directly into the structure, the metallic coating may prevent the integrity of the optical fiber from being compromised, for example, in cases where the strain level of the structure increases, or a crack in the structure occurs.

In one exemplary embodiment of the present invention, the attachment of the strain sensing device to the structure of interest may induce some initial strain in the structure. However, this strain becomes the baseline strain reading for that structure of interest. When measuring the strain on the structure of interest, the user is interested in the change of the strain on the structure, which can be derived. Correlating the strain on the strain sensing device to the strain on the structure allows the user to accurately predict and anticipate failure in the structure and take actions prior to such failure so as to mitigate the damage that may occur.

Temperature also has an effect on the strain of the strain sensing device and the structure. Thus, temperature is measured along the length of the fiber using conventional techniques for measuring temperature, for example using Fiber Bragg gratings as described above. Next, strain due to temperature is separated out from the strain due to the load on the structure to properly evaluate the condition of the structure of interest. Strain due to temperature itself will not typically be of significant concern when it comes to the potential failure of a structure.

The sub-assembly itself can be made in a variety of ways, many of which are commercially available. These involve coating of the desired optical fiber by a combination of extrusions, thermal cure coatings or ultra-violet cured coatings. In an exemplary embodiment, the sub-assembly may be a dielectric sub-assembly. Additionally, the diameter control on the sub-assembly has a direct impact on the variability of strain in the final product, so it should be controlled as tightly as possible given the manufacturing process selected. Once the sub-assembly is formed, it is encased in the metallic coating.

Although the exemplary embodiment of the present invention have been described, it will be understood by those skilled in the art that the present invention should not be limited to the described exemplary embodiments, but various changes and modifications can be made within the spirit and the scope of the present invention. Accordingly, the scope of the present invention is not limited to the described range of the following claims.

What is claimed is:

1. A strain sensing cable comprising:
a sub-assembly;
at least one optical fiber within the sub-assembly; and
a metallic coating which encases the sub-assembly, wherein the metallic coating is strain coupled to the at least one optical fiber along an entire length of the at least one optical fiber by a friction coupling force such that strain is translated from the metallic coating to any point along the entire length of the at least one optical fiber,
wherein an outer diameter of the sub-assembly is greater than an inside diameter of the metallic coating, and the sub-assembly is compressed so as to fit within the metallic coating such that the metallic coating is strain coupled to the at least one optical fiber by the friction coupling force induced by the compression and such that strain is translated from the metallic coating to the at least one optical fiber at any point along the entire length of the at least one optical fiber, and
wherein the strain coupling of the metallic coating and the at least one optical fiber is constantly maintained by the friction coupling force.

2. The strain sensing cable of claim 1, further comprising coupling material between the sub-assembly and the optical fiber.

3. The strain sensing cable of claim 1, wherein an initial outer diameter of the sub-assembly is greater than an inside diameter of the metallic coating, and the sub-assembly within the metal coating is in a compressed state.

4. The strain sensing cable of claim 1, wherein the strain is measured at every point along the entire length of the at least one optical fiber such that continuous measuring is performed along an entire length of the cable.

5. The strain sensing cable of claim 1, wherein the strain is measured at continuous locations extending along the entire length of the at least one optical fiber.

6. The strain sensing cable of claim 1, wherein the stain sensing cable comprises only one metallic layer, which is the metallic coating.

7. A strain sensing cable comprising:
a sub-assembly;
at least one optical fiber within the sub-assembly; and
a metallic coating which encases the sub-assembly, wherein the metallic coating is strain coupled to the at least one optical fiber along an entire length of the at least one optical fiber by a friction coupling force such that strain is translated from the metallic coating to any point along the entire length of the at least one optical fiber,
wherein an outer diameter of the sub-assembly is equal to an inside diameter of the metallic coating, and the sub-assembly is compressed so as to fit within the metallic coating such that the metallic coating is strain coupled to the at least one optical fiber by the friction coupling force induced by the compression and such that strain is translated from the metallic coating to the at least one optical fiber at any point along the entire length of the at least one optical fiber, and
wherein the strain coupling of the metallic coating and the at least one optical fiber is constantly maintained by the friction coupling force.

8. The strain sensing cable of claim 7, wherein an initial outer diameter of the sub-assembly is equal to an inside diameter of the metallic coating, and the sub-assembly within the metal coating is in a compressed state.

9. A strain sensing cable comprising:
a sub-assembly;
at least one optical fiber within the sub-assembly; and
a metallic coating which encases the sub-assembly, wherein the metallic coating is strain coupled to the at least one optical fiber along an entire length of the at least one optical fiber by a friction coupling force such that strain is translated from the metallic coating to any point along the entire length of the at least one optical fiber,
wherein an outer diameter of the sub-assembly is smaller than an inside diameter of the metallic coating, and the metallic coating is compressed onto the sub-assembly such that the metallic coating is strain coupled to the at least one optical fiber by the friction coupling force induced by the compression and so as to translate strain from the metallic coating to the at least one optical fiber at any point along the entire length of the at least one optical fiber, and
wherein the strain coupling of the metallic coating and the at least one optical fiber is constantly maintained by the friction coupling force.

10. The strain sensing cable of claim 9, wherein an outer diameter of the sub-assembly is smaller than an initial inside diameter of the metallic coating, and the metal coating encases the sub-assembly in a compressed state.

11. A strain sensing cable comprising:
a sub-assembly;
at least one optical fiber within the sub-assembly;
a metallic coating which encases the sub-assembly, wherein the metallic coating is strain coupled to the at least one optical fiber along an entire length of the at least one optical fiber by a friction coupling force such that strain is translated from the metallic coating to any point along the entire length of the at least one optical fiber; and
an expansion agent located between the metallic coating and the least one optical fiber, wherein the expansion agent is activated to expand outward in thickness to strain couple the metallic coating to the at least one optical fiber together by the friction coupling force induced by the expansion of the expansion agent, and wherein the strain coupling of the metallic coating and the at least one optical fiber is constantly maintained by the friction coupling force.

12. A strain sensing system comprising:
a strain sensing cable comprising,
a sub-assembly;
at least one optical fiber within the sub-assembly; and
a metallic coating which encases the sub-assembly, wherein the metallic coating is strain coupled to the at least one optical fiber along an entire length of the at least one optical fiber by a friction coupling force such that strain on the metallic coating is translated from the metallic coating to any point along the entire length of the at least one optical fiber;
a structure of interest the strain of which is to be measured, wherein the strain sensing cable is connected to said structure; and
a strain measuring system which measures the strain in the strain sensing cable along the entire length of the at least one optical fiber,
wherein the measured strain on said strain sensing cable is used in determining strain on said structure, and
wherein an outer diameter of the sub-assembly is greater than an inside diameter of the metallic coating, and the sub-assembly is compressed so as to fit within the metallic coating such that the metallic coating is strain coupled to the at least one optical fiber by the friction coupling force induced by the compression and such that strain is translated from the metallic coating to the at least one optical fiber at any point along the entire length of the at least one optical fiber, and
wherein the strain coupling of the metallic coating and the at least one optical fiber is constantly maintained by the friction coupling force.

13. The strain sensing system of claim 12, wherein the strain sensing cable is connected to the structure of interest by the metallic coating.

14. The strain sensing system of claim 12, wherein the strain measuring system eliminates error in strain measurement caused by temperature.

15. The strain sensing system of claim 12, wherein the strain on the cable is measured along the at least one optical fiber in a length direction.

16. The strain sensing system of claim 12, wherein the strain sensing cable further comprises coupling material between the sub-assembly and the at least one optical fiber.

17. The strain sensing system of claim 12, wherein the strain is measured at every point along the entire length of the at least one optical fiber such that continuous measuring is performed along an entire length of the cable.

18. The strain sensing system of claim 12, wherein the strain is measured at continuous locations extending along the entire length of the at least one optical fiber.

19. A method of anticipating failure in a structure, comprising the steps of:
attaching the strain sensing cable of claim 1 to a structure of interest, wherein the strain of said structure is to be measured;
measuring the strain on the strain sensing cable along the entire length of the at least one optical fiber; and
correlating the strain on the cable to the strain on the structure.

20. A method of making a strain sensing cable, comprising:
arranging at least one optical fiber within a sub-assembly;
encasing the sub-assembly within a metallic coating, such that the metallic coating is strain coupled along an entire length of the at least one optical fiber by a friction coupling force such that strain on the metallic coating is translated from the metallic coating to any point along the entire length of the at least one optical fiber; and
configuring the at least one optical fiber to be measured for the strain along the entire length of the at least one optical fiber,
wherein an outer diameter of the sub-assembly is greater than an inside diameter of the metallic coating, further comprising compressing the sub-assembly to fit within the metallic coating such that the metallic coating is strain coupled to the at least one optical fiber by the friction coupling force induced by the compression and such that so as to translate strain from the metallic coating to the at least one optical fiber at any point along the entire length of the at least one optical fiber, and
wherein the strain coupling of the metallic coating and the at least one optical fiber is constantly maintained by the friction coupling force.

21. The method of claim 20, wherein the at least one optical fiber is configured such that the strain is measured at every point along the entire length of the at least one optical fiber such that continuous measuring is performed along an entire length of the cable.

22. The method of claim 20, wherein the at least one optical fiber is configured such that the strain is measured at continuous locations extending along the entire length of the at least one optical fiber.

23. A method of making a strain sensing cable, comprising:
arranging at least one optical fiber within a sub-assembly;
encasing the sub-assembly within a metallic coating, such that the metallic coating is strain coupled along an entire length of the at least one optical fiber by a friction coupling force such that strain on the metallic coating is translated from the metallic coating to any point along the entire length of the at least one optical fiber; and
configuring the at least one optical fiber to be measured for the strain along the entire length of the at least one optical fiber,
wherein an outer diameter of the sub-assembly is equal to an inside diameter of the metallic coating, further comprising compressing the sub-assembly so as to fit within the metallic coating such that the metallic coating is strain coupled to the at least one optical fiber by the friction coupling force induced by the compression and so as to translate strain from the metallic coating to the at least one optical fiber at any point along the entire length of the at least one optical fiber, and
wherein the strain coupling of the metallic coating and the at least one optical fiber is constantly maintained by the friction coupling force.

24. A method of making a strain sensing cable, comprising:
arranging at least one optical fiber within a sub-assembly;
encasing the sub-assembly within a metallic coating, such that the metallic coating is strain coupled along an entire length of the at least one optical fiber by a friction coupling force such that strain on the metallic coating is translated from the metallic coating to any point along the entire length of the at least one optical fiber; and
configuring the at least one optical fiber to be measured for the strain along the entire length of the at least one optical fiber,
wherein an outer diameter of the sub-assembly is smaller than an inside diameter of the metallic coating, further comprising compressing the metallic coating onto the sub-assembly such that the metallic coating is strain coupled to the at least one optical fiber by the friction coupling force induced by the compression and so as to translate strain from the metallic coating to the at least one optical fiber at any point along the entire length of the at least one optical fiber, and wherein the strain coupling of the metallic coating and the at least one optical fiber is constantly maintained by the friction coupling force.

25. A method of making a strain sensing cable, comprising:

arranging at least one optical fiber within a sub-assembly;

encasing the sub-assembly within a metallic coating, such that the metallic coating is strain coupled along an entire length of the at least one optical fiber by a friction coupling force such that strain on the metallic coating is translated from the metallic coating to any point along the entire length of the at least one optical fiber;

configuring the at least one optical fiber to be measured for the strain along the entire length of the at least one optical fiber; and placing an expansion agent between the metallic coating and the least one optical fiber, and activating the expansion agent to expand outward in thickness to strain couple the metallic coating to the at least one optical fiber together by the friction coupling force induced by the expansion of the expansion agent, and wherein the strain coupling of the metallic coating and the at least one optical fiber is constantly maintained by the friction coupling force.

* * * * *